United States Patent
Pywell et al.

(10) Patent No.: US 10,040,398 B2
(45) Date of Patent: Aug. 7, 2018

(54) WIRE TIPPED SECOND ROW SEATBACK WITH INTEGRATED STORAGE

(71) Applicant: GM Global Technology Operations LLC, Detroit, MI (US)

(72) Inventors: James F. Pywell, Shelby Township, MI (US); Matthew P. Meyer, Oxford, MI (US); Kevin T. Joy, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 136 days.

(21) Appl. No.: 14/681,542

(22) Filed: Apr. 8, 2015

(65) Prior Publication Data

US 2015/0298615 A1   Oct. 22, 2015

Related U.S. Application Data (60) Provisional application No. 61/982,033, filed on Apr. 21, 2014.

(51) Int. Cl.
| | |
|---|---|
| *B60R 7/04* | (2006.01) |
| *B60N 2/36* | (2006.01) |
| *B60N 2/30* | (2006.01) |
| *B60N 2/64* | (2006.01) |
| *B60N 2/22* | (2006.01) |
| *B60N 2/28* | (2006.01) |
| *B60N 2/20* | (2006.01) |

(52) U.S. Cl.
CPC .............. *B60R 7/043* (2013.01); *B60N 2/206* (2013.01); *B60N 2/22* (2013.01); *B60N 2/289* (2013.01); *B60N 2/305* (2013.01); *B60N 2/3013* (2013.01); *B60N 2/36* (2013.01); *B60N 2/64* (2013.01)

(58) Field of Classification Search
CPC ........ B60R 7/043; B60N 2/3013; B60N 2/22; B60N 2/64; B60N 2/36; B60N 2/206; B60N 2/305; B60N 2/289
USPC .................. 297/188.04, 253, 452.18, 378.13
See application file for complete search history.

(56) References Cited

U.S. PATENT DOCUMENTS

| | | | | |
|---|---|---|---|---|
| 3,550,949 A | * | 12/1970 | Bonnaud .............. | B60N 2/3013 296/69 |
| 3,669,488 A | * | 6/1972 | Derrickson, Jr. .... | B60N 2/3013 296/66 |
| 6,030,046 A | * | 2/2000 | Dorow ................ | B60N 2/2821 297/216.11 |
| 6,237,825 B1 | * | 5/2001 | Pencoske .............. | A45C 13/08 224/627 |
| 2004/0244115 A1 | * | 12/2004 | Adams ..................... | A45F 3/12 5/636 |

(Continued)

FOREIGN PATENT DOCUMENTS

| | | |
|---|---|---|
| CN | 101519049 A | 9/2009 |
| CN | 203358401 U | 12/2013 |

OTHER PUBLICATIONS

Chinese Office Action dated Dec. 21, 2016 ; Application No. 201510189703.8; Applicant: GM Global Technology Operations LLC.; 8 pages.

*Primary Examiner* — Milton Nelson, Jr.
(74) *Attorney, Agent, or Firm* — BrooksGroup (57) ABSTRACT

A number of variations may include a vehicle seatback support pivotally connected to the vehicle body, and wherein the seatback support includes an integrated storage cavity.

18 Claims, 10 Drawing Sheets

(56) References Cited

U.S. PATENT DOCUMENTS

2008/0252111 A1* 10/2008 Rothkop ................ B60N 3/004
  297/188.04
2010/0156163 A1*  6/2010 Daisuke ............... B60N 2/4613
  297/452.2

* cited by examiner

WIRE TIPPED SECOND ROW SEATBACK WITH INTEGRATED STORAGE

CROSS-REFERENCE TO RELATED APPLICATIONS

This application claims the benefit of the U.S. Provisional Application No. 61/982,033 filed Apr. 21, 2014.

TECHNICAL FIELD

The field to which the disclosure generally relates to includes vehicle seats, and vehicle seat and cabin combinations.

BACKGROUND

Vehicles may include seats and a passenger cabin.

SUMMARY OF ILLUSTRATIVE VARIATIONS

A number of variations may include a vehicle seatback support pivotally connected to the vehicle body, and wherein the seatback support includes an integrated storage cavity.

A number of other illustrative variations may include a vehicle which may have a vehicle seat. The vehicle seat may include a vehicle seatback support and may have at least one storage cavity defined in a rear face of the seatback support. Additionally, the at least one storage cavity may be a cord volume from the vehicle seat.

Yet a number of other illustrative variations may include a product which may include a vehicle seatback support. The vehicle seatback support may have at least one storage cavity which may be defined in a rear face of the seatback support. Additionally, the seatback support may include hinge features which may pivotally connect the seatback support to a vehicle body. Additionally, an ISOfix wire may be operably coupled to the vehicle body. The ISOfix wire may provide a plurality of connection features or points for connecting a child seat thereto.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
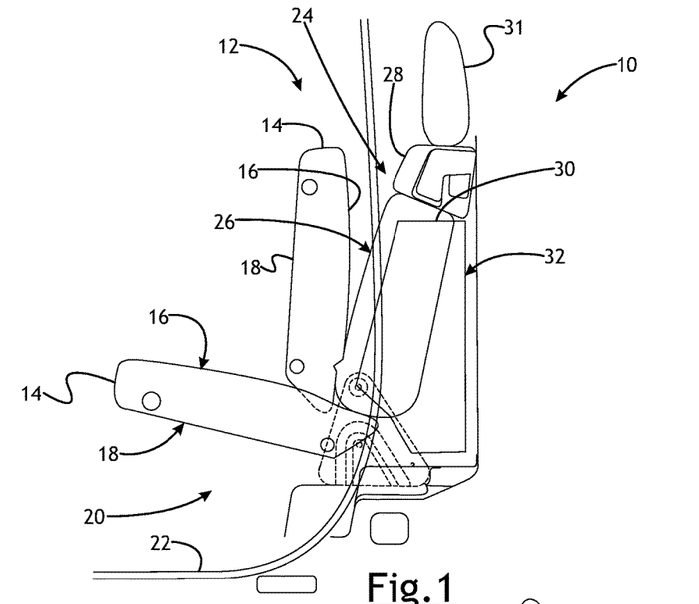
FIG. 1 is a schematic illustration of a vehicle seat including a seatback having a seatback support pivotally connected to the vehicle, and wherein the seatback support includes a storage cavity according to a number of variations.

A number of variations are illustrated in FIG. 1 which may include a product 10 which may include a vehicle seat 12 which may have a seat bottom 14 having a top surface 16 constructed and arranged to support a vehicle passenger sitting thereon and an opposite bottom seat 18. The seat 12 may be placed in a vehicle cabin having a floor board 22. In a number of variations the floor board 22 and the seat bottom 14 may be constructed and arranged to provide a storage space 20 between the bottom surface 18 of the seat bottom 14 when the seat bottom 14 is in a down position. In a number of variations, the seat 12 may be constructed and arranged to be particularly suitable for use as a rear seat in a pickup truck cabin. The seat bottom 14 may be pivoted upward as shown in FIG. 1 so that the top surface 16 of the seat bottom 14 faces a seatback 24. The seatback 24 may include at least a first seatback cushion 26 provided over a seatback support 30. In a number of variations, a second seatback cushion 28 may also be provided over the seatback support 30 and may be located in a position above the first seatback cushion 26. In a number of variations, a headrest 31 may be provided and attached to the seatback 24. The vehicle may also include a rear cabin wall 36 which may have a notched portion 38 formed therein. The seatback support 30 may have a rear face 33 having a seatback support storage cavity 32 defined therein.

Figure 2:
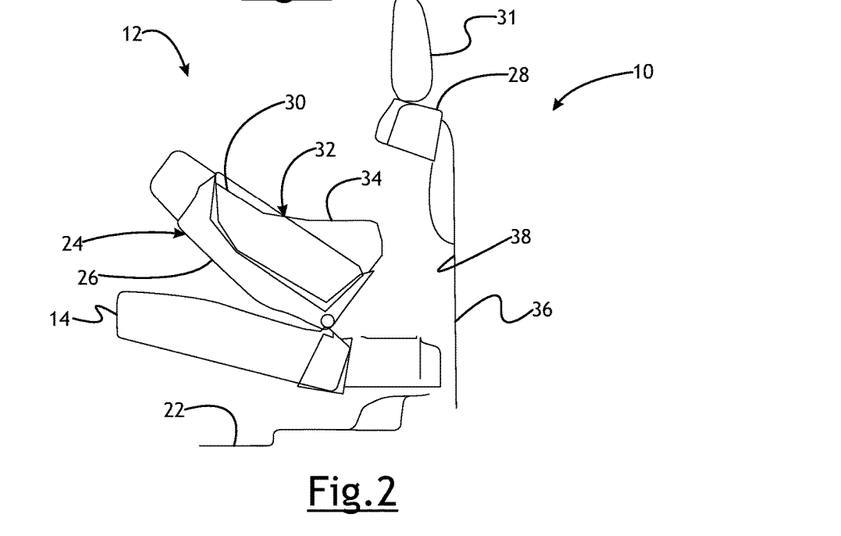
FIG. 2 illustrates a seatback with an integrated storage cavity wherein the seatback is tilted or tipped forward to allow access to a storage cavity integrated in the seatback according to a number of variations.

A number of variations are illustrated in FIG. 2 which may include a vehicle cabin including a rear wall 36 having a notched portion 38 formed therein. The seatback support 30 including a storage cavity 32 may have a cargo bag or sleeve 34 received at least partially therein and a portion of the cargo bag or sleeve 34 may be received in the area defined by the notched portion 38 and the rear wall 36.

Referring again to the variation illustrated in FIG. 2, it is contemplated that the vehicle seat 12 may include bright line hinges which may be attached to a forward base of the seatback. The hinges may be constructed and arranged to allow the seatback to move forward such that the seatback 24 may move forward towards the seat bottom 14. It is contemplated that the seatback 24 may touch the seat bottom 14 or may come in very close contact with the seat bottom 14. Additionally it is contemplated that the hinges may be bright lined hinges or any other type of hinge as known by one of ordinary skill in the art. Moreover, it is contemplated that the hinges may extend across the seatback 24. However, the hinges may not extend to an arm rest surfaces. As illustrated in FIG. 2, the seatback 24 may move forward towards the seat bottom 14 while the second seatback cushion 28 along with the headrest 31 may stay in place.

Figure 3:
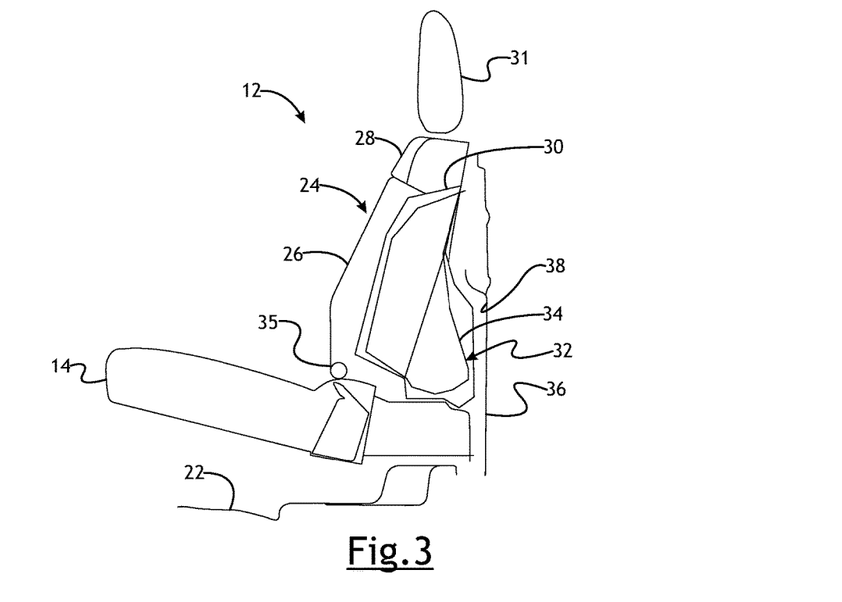
FIG. 3 is a schematic illustration of a seatback having an integrated storage cavity, and further including a cargo bag or sleeve received in the storage cavity.

FIG. 3 illustrates a number of other variations wherein a seatback 24 may be pivoted to an upright position and wherein the cargo bag or sleeve 34 may be partially received in the storage cavity 32 defined in the seatback support 30 and partially by the area defined by the space between the notched portion 38 and the rear wall of the cabin and the seatback 24.

Referring again to the variation illustrated in FIG. 3, it is contemplated that the storage cavity 32 may be a cord volume from a rear portion of the seatback 24. Additional volume may be available based on a structure of the rear wall 36 and the vehicle seat 12. It is additionally contemplated that the storage cavity 32 may include the storage bag 34 or liner which may extend into the cab and/or may extend the available cord volume. It is additionally contemplated that the storage bag 34 and/or the storage cavity 32 may be constructed and arranged to include a Velcro or snap flap or other device which would allow for easy item access and item enclosure. It is also contemplated that the storage bag 34 may be attached to the rear cab wall 36 in order to prevent forward excursion of materials which may be contained therein.

Figure 4:
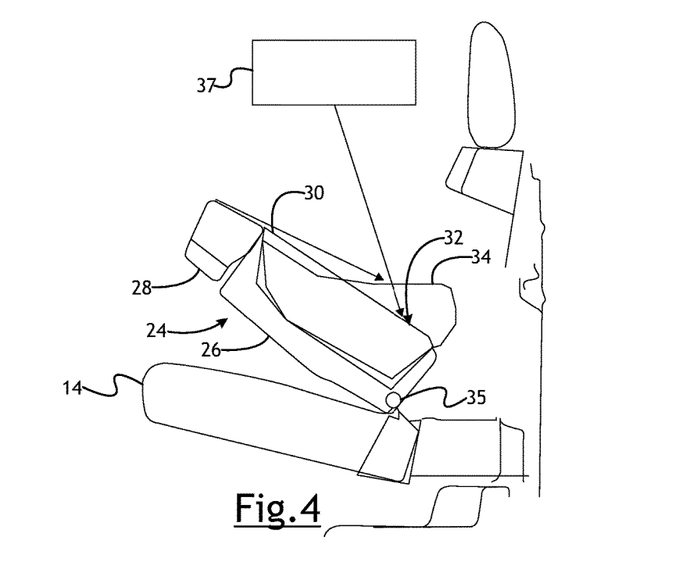
FIG. 4 is a schematic illustration of a seatback including a storage cavity that may include at least one of a cargo bag, sleeve or a cargo net covering at least a portion of the storage cavity defined in the seatback according to a number of variations.

FIG. 4 illustrates a number of variations in which a cargo bag or sleeve 34 may be received in the storage cavity 32 formed in the seatback support 30 and/or a cargo net 37 may be received over at least a portion of the storage cavity 32. It is contemplated that the cargo net 37 may be disposed over the entire storage cavity 32 or may be disposed only on an upper portion of the storage cavity 32. Moreover, it is contemplated that the cargo net 37 may be disposed over the cargo bag portion 34 of the storage cavity 32. It is contemplated that the cargo net 37 may be constructed and arranged to securely hold items in the storage cavity 32.

Figure 5:
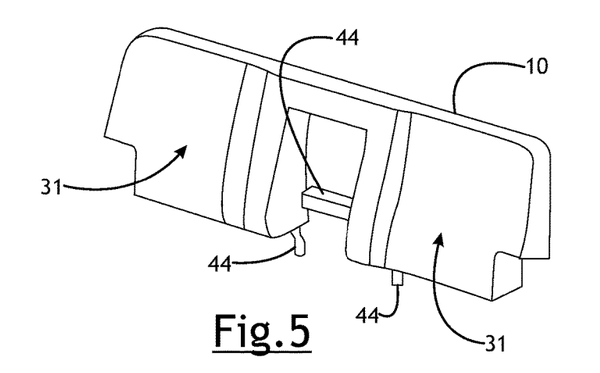
FIG. 5 is a perspective view of a seatback support showing a front face thereof according to a number of variations.

FIG. 5 illustrates a number of variations including a seatback support 30 showing a front face 31 thereof. In a number of variations the seatback support 30 may include a molded material which may be made from a plurality of different polymers including expanded polypropylene (EPP), or other polymeric materials which may also include reinforcing particles, fibers or metal structures. The seatback support 30 may also include a metal frame 44 attached to or molded therein. Additionally, the seatback support 30 may include an additional seatback material which may be provided to structurally reinforce the seatback support. The additional seatback material may be disposed in the area defining the storage cavity 32 as illustrated in FIG. 6, or may be disposed in any other area the seatback support 30 which may require additional reinforcement support.

Figure 6:
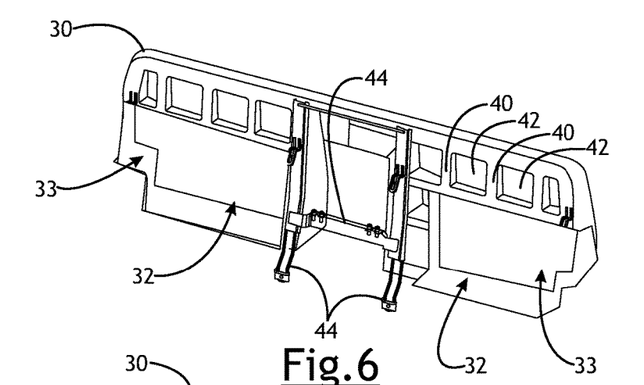
FIG. 6 is a perspective view of a seatback support having at least one storage cavity defined in the rear face thereof according to a number of variations.

FIG. 6 illustrates a seatback support 30 showing a rear face 33 thereof. In a number of variations, the seatback support 30 may be constructed and arranged to provide a plurality of structural support beams 40 defining a plurality of cavities 42 in a manner sufficient to provide sufficient support for a passenger resting against the seatback support 30 and to reduce weight and cost of the seatback support 30. In a number of variations, one or more storage cavities 32 may be formed in the rear face 33 of the seatback support 30. It is contemplated that one or more of the storage cavities may include a storage bag liner in order to maximize both of the volumes available behind the vehicle seat. Additionally the storage cavities may include a nylon portion which may prevent fracture upon high rearward forces on the seatback. It is contemplated that the material may be additionally or alternatively any other material as known by one of ordinary skill in the art which may prevent fracture or breakage during high force times. It is also contemplated that the pivot hinges may be disposed on a lower forward edge of the seatback 24.

Figure 7:
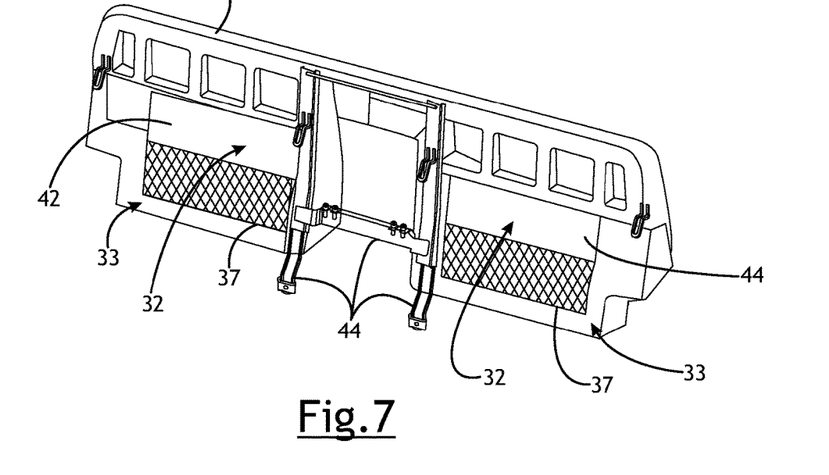
FIG. 7 is a perspective view of the seatback support having at least one storage cavity defined therein, a reinforcement material adhered to the seatback support in the area defining the storage cavity, and a cargo net covering at least a portion of the storage cavity according to a number of variations.

FIG. 7 illustrates a number of variations which may include an additional seatback material 44 which may be provided to structurally reinforce the seatback support 30 in the area defining the storage cavity 32 (shown in FIG. 6). In a number of variations the addition material 44 may be nylon. A cargo mesh 37 may cover at least a portion of the area defining the cargo or sleeve cavity 32. It is contemplated that the cargo mesh may be an expandable nylon storage net or any other type of cargo mesh which may be constructed and arranged to prevent items from being removed unintentionally from the storage cavity.

Figure 8:
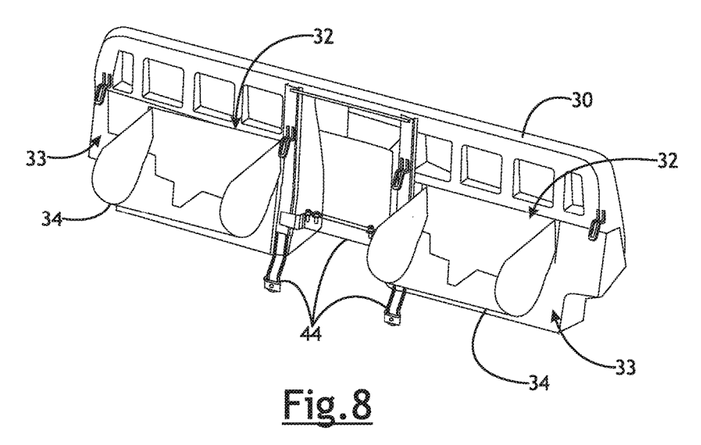
FIG. 8 is a perspective of a seatback support having a storage cavity defined in the rear face thereof and a cargo bag or sleeve attached to the rear face of the seatback support and received in the storage cavity according to a number of variations.

FIG. 8 is a schematic illustration of a number of variations which may include a seatback support 30 having a cargo bag or sleeve 34 having at least the portion thereof received in a storage cavity 32 formed in the rear face 33 of the seatback support 30. It is contemplated that the storage bag liners may be sized in order to maximize both available volumes disposed behind the vehicle seat 12.

Figure 9:
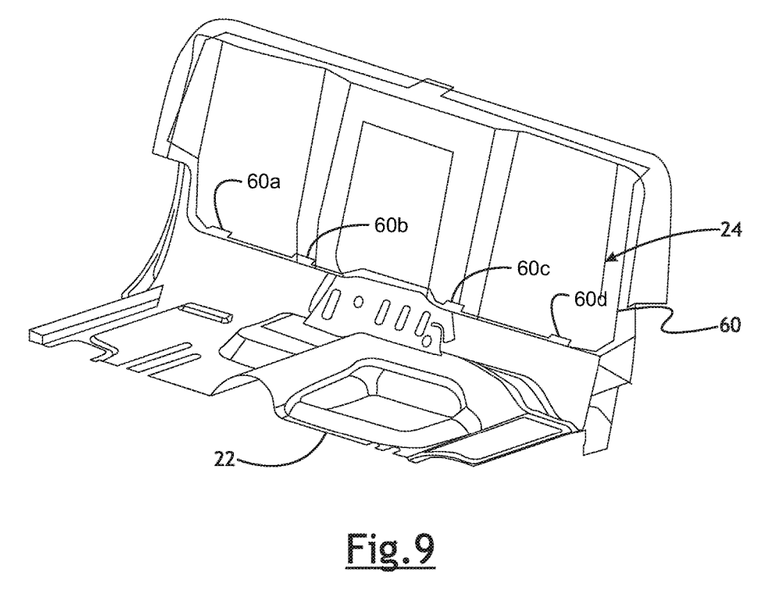
FIG. 9 is a schematic illustration of a vehicle seatback pivotally connected to a vehicle body component according to a number of variations.

FIG. 9 illustrates a number of variations including the vehicle seatback 24. In a number of variations the vehicle may include an ISOfix wire 60 carried by the vehicle body which may include a plurality of connection features or points 60a, 60b, 60c, 60d which may be used to pivotally connect the seatback 24 using a plurality of hinge features defined in the seatback support 30. The connection features or points 60a, 60b, 60c, 60d formed in the ISOfix wire 60 may be the same connection points used to connect a child seat to the ISOfix wire 60. In a number of variations the seatback support 30 may have two or more hinge features connected to one of the connection points on the ISOfix wire 60. The hinge features may be spread apart from each other and still provide access there between for connection of a child seat to the connection features or points 60a, 60b, 60c, 60d of the ISOfix wire 60. In other variations, the connection features or points 60a, 60b, 60c, 60d may be made wide enough to accommodate connecting a child seat next to two or more hinge features connected to the ISOfix wire 60 at the connection features or points.

Figure 10:
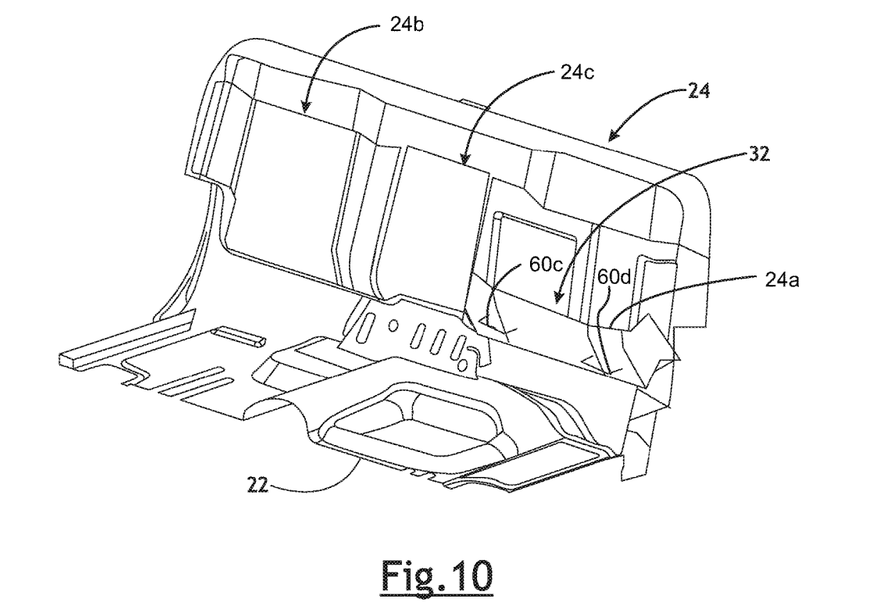
FIG. 10 is a schematic illustration of a seatback pivotally connected to a vehicle body component showing a portion of the seatback tipped or tilted forward according to a number of variations.

FIG. 10 illustrates a number of variations wherein the seatback 24 may include one or more separate sections 24a, 24b, 24c each of which may be designed to support the back of a passenger and wherein each section 24a, 24b and/or 24c may be individually tilted forward to allow access by a passenger to the storage cavity 32 formed in the rear face of the seatback support 30. Additionally it is contemplated that each of the seatback sections 24a, 24b, and/or 24c may be pivotally connected such that each of 24a, 24b, and/or 24c may be tilted in unison to allow the passenger access to each of the storage cavities 32 which may be formed in the rear face of the seatback support.

Figure 11:
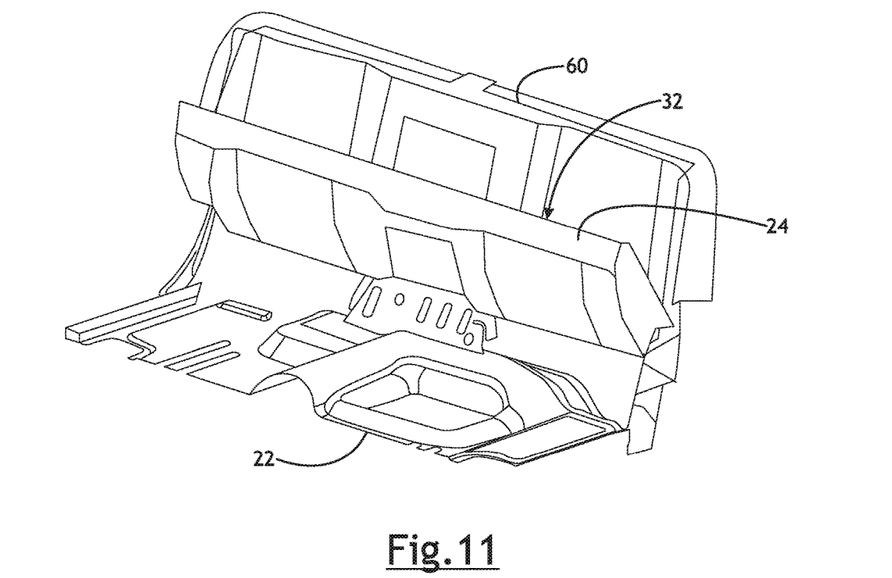
FIG. 11 is a schematic illustration of a seatback pivotally connected to a vehicle body component and showing the entire seatback tilted or tipped forward according to a number of variations.

FIG. 11 illustrates a number of variations wherein the entire seatback 24 may be tilted or tipped forward to allow a passenger to gain access to the storage cavity 32 formed in the rear face of the seatback support 30.

Figure 12:
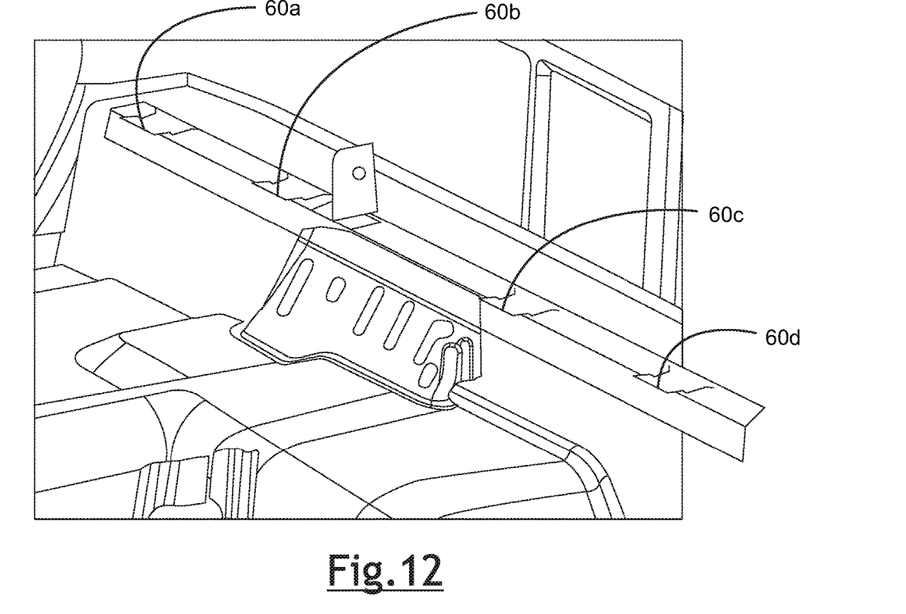
FIG. 12 illustrates a vehicle including a passenger cabin portion and a plurality of attachment points for a seatback according to a number of variations.

FIG. 12 illustrates a number of variations wherein the vehicle is equipped with a plurality of U-shaped connection features or points 60a, 60b, 60c, 60d for pivotally connecting the seatback thereto. Additionally, the vehicle may include an aluminum panel which may be disposed across the seatback portion. It is contemplated that the aluminum panel may include access holes. It is contemplated that the access holes may be constructed and arranged to allow ISO wires to go through the aluminum panel. Additionally, ISO wires 60 may be welded to the bracket. Moreover, the vehicle may include a center hinge. It is contemplated that the center hinge may be a CRS type hinge and may be comprised of steel or may be any other hinge as known by one of ordinary skill in the art. Additionally, cab width steel reinforcement brackets which may include ISOfix wires 60 may be riveted onto the aluminum panel. It is also contemplated that the reinforcement bracket may be attached in any other manner to the aluminum shelf as known by one of ordinary skill in the art.

Figure 13:
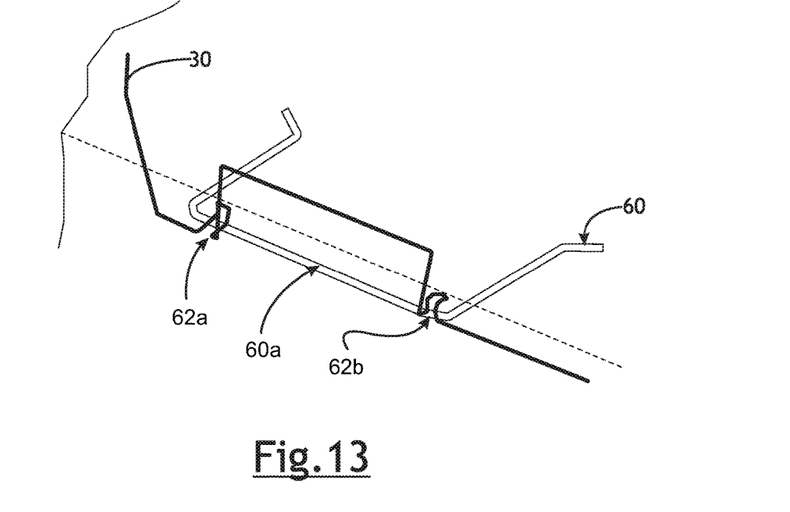
FIG. 13 is a schematic illustration illustrating a portion of a seatback pivotally connected to a wire structure of a vehicle body wherein the seatback includes at least one hinge for pivotal movement about the wire carried by the vehicle body according to a number of variations.

FIG. 13 is a schematic illustration showing a connection point 60a which may have a U-shape formed in the ISO wire frame 60 onto which hinge features 62a, 62b formed in the seatback support 30 may be connected for pivotal movement about the connection feature or point 60a according to a number of variations. It is contemplated that the ISO wire frame 60 may be a 50 mm flat wire ISOfix wire. It is also contemplated that the ISO wire frame 60 may be any other standard wire frame as known by one of ordinary skill in the art. Additionally, it is contemplated that the ISO wire frame 60 may be welded to a flat cross member in order to provide additional support. It is contemplated that a shell portion of the seatback 24 may include an ISOfix wire as a hinge element for the vehicle seatback. As illustrated in FIG. 13, the seatback support shell may loop around the ISOfix wire 60 at least once. It is contemplated that a first loop around the ISOfix wire 60 may allow for tip displacement. Moreover, a second opposing loop design may support vertical placement of the seatback 24. Additional loops as known by one of ordinary skill in the art are additionally contemplated.

Figure 14:
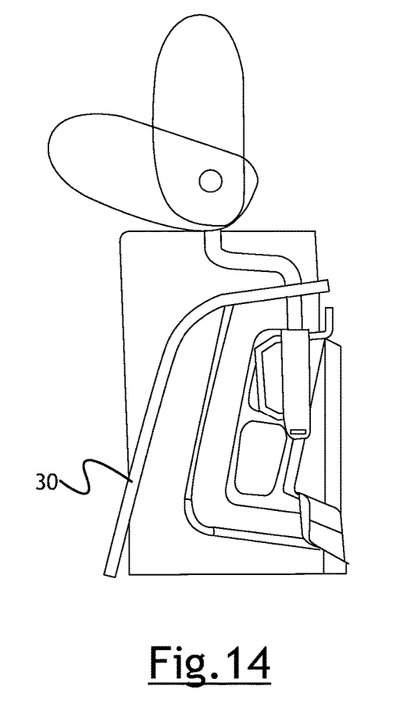
FIG. 14 is a schematic illustration showing a pivotal seatback in an upright position wherein a vehicle passenger may rest his or her back thereon according to a number of variations.

FIG. 14 is a schematic illustration showing the pivotal seatback support 30 in an upright position wherein a vehicle passenger may rest his or her back thereon according to a number of variations. It is contemplated that the headrest portion 31 may be constructed and arranged to tilt forward when desired by a passenger. It is contemplated that the headrest 31 may be tilted in any of the positions of the seatback 24. Moreover, the vehicle seat 12 may include an integration bar which may include a top tether and/or an upper seatback latch which may allow the headrest 31 to tilt when desired. Additionally, a rod may be disposed from the vehicle seatback 24 to the headrest 31. The rod may be a conformed head restraint rod as known by one of ordinary skill in the art. It is also contemplated that the rod may be curved or have additional geometry in order to provide optimal comfort for a vehicle passenger. The vehicle seat 12 may also include a head restraint sleeve. It is contemplated that the head restraint sleeve may be a non-removable head restraint sleeve.

Figure 15:
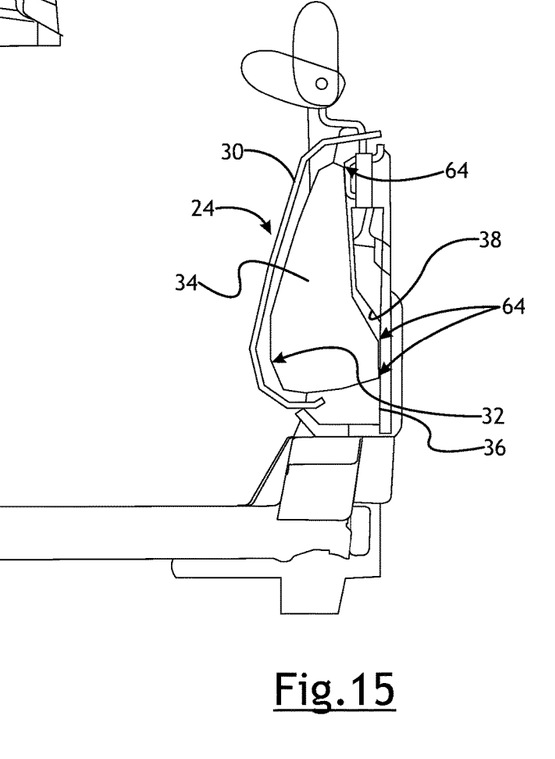
FIG. 15 is a schematic illustration of a seatback pivotally connected to a vehicle body, and wherein the seatback includes a seatback support defining a storage cavity and illustrating at least one attachment point for a cargo bag or sleeve to be attached to the seatback support according to a number of variations.

FIG. 15 is a schematic illustration of a seatback pivotally connected to a vehicle body, and wherein the seatback 24 includes a seatback support 30 defining a storage cavity 32 and illustrating a plurality of attachment points 64 for a cargo bag or sleeve to be attached to the seatback support 30 according to a number of variations. It is contemplated that the cargo bag may have a defined geometry in order to maximize the space of the storage cavity behind the vehicle seat.

Figure 16:
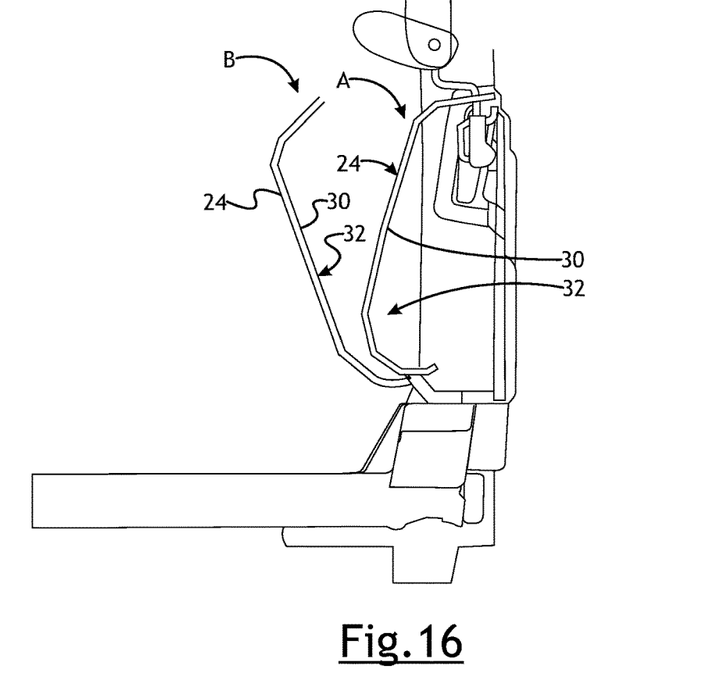
FIG. 16 is a schematic illustration showing a pivotal seatback moving from an upright position to a tilted or tipped forward position wherein a passenger can gain access to the storage cavity defined in a seatback support of the seatback according to a number of variations.

FIG. 16 is a schematic illustration showing a pivotal seatback 24 in first position (A) which is upright for a passenger to rest his or her back thereon and moveable to a tilted or tipped forward position (B) wherein a passenger can gain access to a storage cavity 32 defined in the seatback support 30 of the seatback 24.

Figure 17:
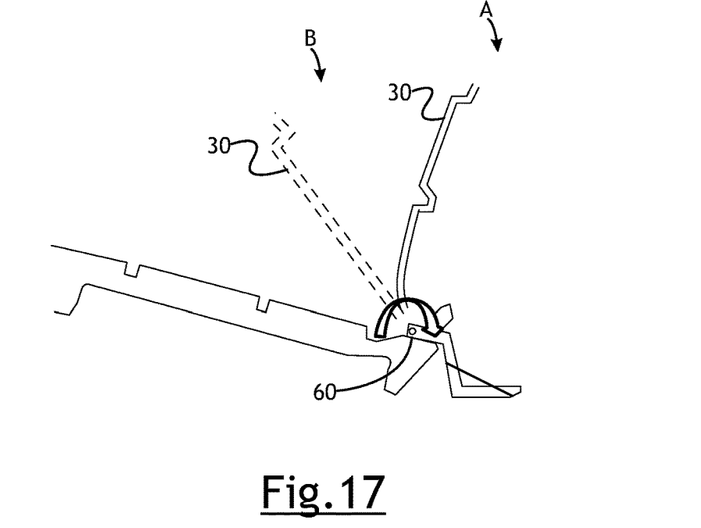
FIG. 17 is a schematic illustration showing a seatback support pivotally connected to a hinge point of a vehicle body and moved from an upright position to a tilted or tipped forward position according to a number of variations.

FIG. 17 is a schematic illustration showing a seatback support 30 pivotally connected to a vehicle body hinge point 60 according to a number of variations and shown in an upright position (A) and a tilted or tipped forward position (B). According to one variation, a circle of rotation of the seatback may include an approximate radius of 2-4 mm, and approximately 3 mm. Additionally, the circle may also include a length of approximately 18-20 mm, approximately 18 mm.

Figure 18:
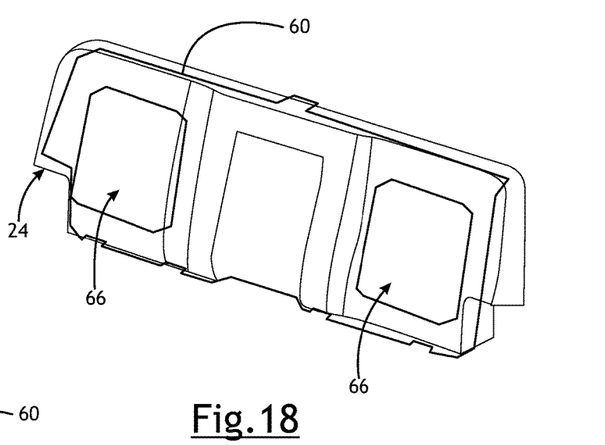
FIG. 18 is a schematic illustration of a seatback pivotally connected to a vehicle body component and wherein the seatback includes shell substrate that may be cored or locally replaced with a compliant weave for comfort in back inserts according to a number of variations.

FIG. 18 is a schematic illustration of a seatback 24 pivotally connected to a body by way of an ISOfix wire 60, and wherein the seatback 24 includes a shell substrate that may be cored or locally replaced with compliant weave material 66 for comfort in back inserts provided therein according to a number of variations.

Figure 19:
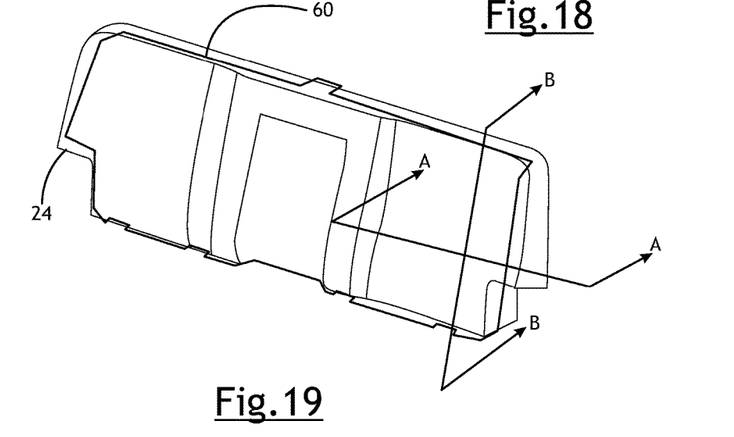
FIG. 19 is a schematic illustration of a seatback pivotally connected to a vehicle component according to a number of variations.

FIG. 19 is a schematic illustration of a seatback 24 pivotally connected to an ISOfix wire 60 of a vehicle according to a number or variations.

Figure 20:
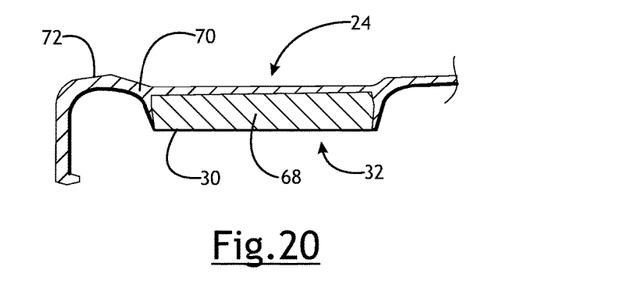
FIG. 20 is a sectional view taken along lines A-A of FIG. 19.

FIG. 20 is a sectional view taken along lines A-A of FIG. 19 and showing a seatback support 30 having a skived insert comfort foam 68 provided over a portion thereof, with polyurethane 70 poured and formed over the exposed hard surface portions of the seatback support 30 and over a portion of the skived insert comfort foam 68. A trim surface material 72 may be provided over the polyurethane foam 70.

Figure 21:
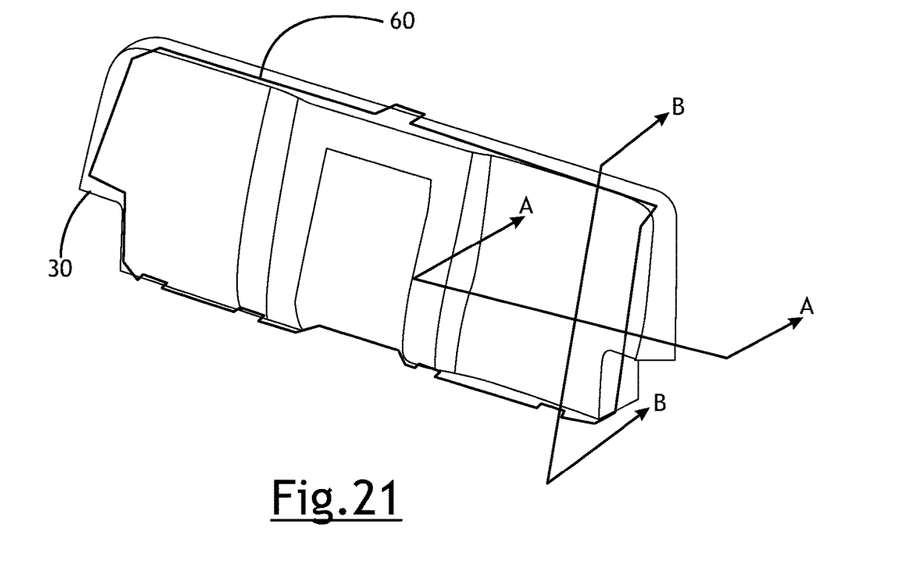
FIG. 21 is a schematic illustration of a seatback pivotally connected to a vehicle component according to a number of variations.

FIG. 21 illustrates a schematic illustration of the seatback 24 which may be pivotally connected to the ISOfix wire 60 of the vehicle according to a number of variations.

Figure 22:
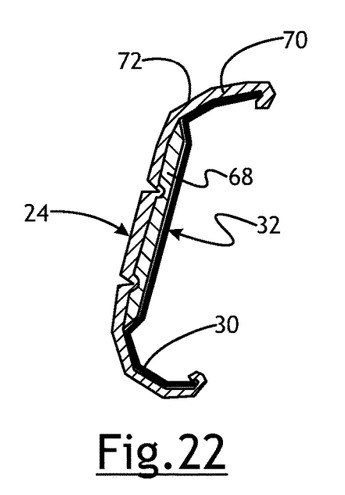
FIG. 22 is a sectional view taken along lines B-B of FIG. 19.

FIG. 22 is a sectional view taken along lines B-B of FIG. 19 showing a seatback 24 having a storage cavity 32 defined in the seatback support 30 according to a number of variations. Again, the seatback support 30 may have a skived insert comfort foam portion which may be provided over at least a portion of the seatback support. Additionally, polyurethane may be poured and formed over the exposed surface portions of the seatback support 30 and over a portion of the comfort foam. Moreover, a trim surface material may be provided over the polyurethane foam.

The above description of select variations within the scope of the invention is merely illustrative in nature and, thus, variations or variants thereof are not to be regarded as a departure from the spirit and scope of the invention.

Variation 1 may include a product which may include a vehicle seatback support having at least one storage cavity which may be defined in a rear space of the seatback support, the seatback support may also include hinge features to pivotally connect the seatback support to a vehicle body.

Variation 2 may include the product as set forth in variation 1 wherein the seatback support may comprise expanded polypropylene.

Variation 3 may include the product as set forth in any of variations 1 to 2 wherein the seatback support may be constructed and arranged for use in a rear seat in a cabin of a pickup truck.

Variation 4 may include the product as set forth in any of variations 1 to 3 further including cargo bag or sleeve which may be attached to the seatback support and at least partially received in the storage cavity formed in the rear face of the seatback support.

Variation 5 may include the product as set forth in any of variations 1 to 4 and may further a cargo mesh which may cover at least a portion of the storage cavity defined in the rear face of the seatback support.

Variation 6 may include the product as set forth in any of variations 1 to 5 and may further include a vehicle body and an ISOfix wire which may be connected to the vehicle body, the ISOfix wire may provide a plurality of connection features or points for connecting a child seat thereto and wherein the seatback support may include a plurality of hinge features formed therein which may be constructed and arranged to be connected to one of the connection features or points of the ISOfix wire in order to pivotally move the seatback support about the one connection feature or point.

Variation 7 may include the product as set forth in any of variations 1 to 6 wherein the cargo bag may include a Velcro or snap flap enclosure portion.

Variation 8 may include a vehicle which may have a vehicle seat which may include a vehicle seatback support and may include at least one storage cavity defined in a rear face of the seatback support, wherein the at least one storage cavity may be a cord volume from the vehicle seat.

Variation 9 may include the vehicle as set forth in variation 8 wherein the seatback support may include hinge features for pivotally connecting the seatback support to the vehicle.

Variation 10 may include the vehicle as set forth in any of variations 8 to 9 wherein the seatback support may include expanded polypropylene.

Variation 11 may include the vehicle as set forth in any of variations 8 to 10 wherein the seatback support may be constructed and arranged for use in a rear seat and a cabin of a pickup truck.

Variation 12 may include the vehicle as set forth in any of variations 8 to 11 and may further include a cargo bag or a sleeve which may be attached to the seatback support and may be at least partially received in the storage cavity formed in the rear face of the seatback support.

Variation 13 may include the vehicle as set forth in any of variations 8 to 12 and may further include a cargo mesh which may cover at least a portion of the storage cavity defined in the rear face of the seatback support.

Variation 14 may include the vehicle as set forth in any of variations 8 to 13 and may further include a vehicle body and an ISOfix wire which may be connected to the vehicle body, the ISOfix wire may provide a plurality of connection features or points for connecting a child seat thereto, and wherein the seatback support may include a plurality of hinge features formed therein constructed and arranged to be connected to one of the connection features or points of the ISOfix wire in order to pivotally move the seatback support about the one connection feature or point.

Variation 15 may include the vehicle as set forth in any of variations 8 to 14 wherein the cargo bag may include a Velcro or snap flap enclosure portion.

Variation 16 may include a product which may include a vehicle seatback support which may have at least one storage cavity defined in a rear face of the seatback support, the seatback support may include hinge features for pivotally connecting the seatback support to the vehicle body, and an ISOfix wire operably coupled to the vehicle body wherein the ISOfix wire may provide a plurality of connection features or points for connecting a child seat thereto.

Variation 17 may include the product as set forth in variation 16 wherein the seatback support may include expanded polypropylene.

Variation 18 may include the product as set forth in any of variations 16 to 17 wherein the seatback support may be constructed and arranged for use in a rear seat in a cabin of a pickup truck.

Variation 19 may include the product as set forth in any of variations 16 to 18 and may further include a cargo mesh covering at least a portion of the storage cavity defined in the rear face of the seatback support.

Variation 20 may include the product as set forth in any of variations 16 to 19 wherein the cargo bed may include a Velcro or snap flap enclosure portion.

What is claimed is:

1. A product comprising:
   a vehicle seatback support having at least one storage cavity defined in a rear face of the seatback support, the seatback support including a plurality of hinge features for pivotally connecting the seatback support to a vehicle body, further comprising a vehicle body, and an ISOfix wire connected to the vehicle body, the ISOfix wire providing a plurality of connection features or points for connecting a child seat thereto, and wherein the seatback support includes the plurality of hinge features, wherein one hinge of the plurality of hinge features is pivotally connected to one of the connection features or points of the ISOfix wire to pivotally move the seatback support about the one connection feature or point.

2. A product as set forth in claim 1 wherein the seatback support comprises expanded polypropylene.

3. A product as set forth in claim 1 wherein the seatback support is constructed and arranged for use in a rear seat in a cabin of a pickup truck.

4. A product as set forth in claim 1 further comprising a cargo mesh covering at least a portion of the storage cavity defined in the rear face of the seatback support.

5. A product as set forth in claim 1 further comprising a cargo bag or sleeve attached to the seatback support and at least partially received in the storage cavity formed in the rear face of the seatback support.

6. A product as set forth in claim 5, wherein the cargo bag includes a snap flap enclosure portion.

7. A vehicle comprising:
a vehicle seat comprising a vehicle seatback support including at least one storage cavity defined in a rear face of the seatback support, wherein the at least one storage cavity is a cored volume from the vehicle seat, further comprising a vehicle body, and an ISOfix wire connected to the vehicle body, the ISOfix wire providing a plurality of connection features or points for connecting a child seat thereto, and wherein the seatback support includes a plurality of hinge features, wherein one hinge of the plurality of hinge features is pivotally connected to one of the connection features or points of the ISOfix wire to pivotally move the seatback support about the one connection feature or point.

8. The vehicle of claim 7 wherein the cargo bag includes a snap flap enclosure portion.

9. The vehicle of claim 7, wherein the seatback support includes hinge features for pivotally connecting the seatback support to the vehicle.

10. The vehicle of claim 7, wherein the seatback support comprises expanded polypropylene.

11. The vehicle of claim 7, wherein the seatback support is constructed and arranged for use in a rear seat in a cabin of a pickup truck.

12. The vehicle of claim 7, further comprising a cargo bag or sleeve attached to the seatback support and at least partially received in the storage cavity formed in the rear face of the seatback support.

13. The vehicle of claim 7, further comprising a cargo mesh covering at least a portion of the storage cavity defined in the rear face of the seatback support.

14. A product comprising:
a vehicle seatback support having at least one storage cavity defined in a rear face of the seatback support, the seatback support including hinge features for pivotally connecting the seatback support to a vehicle body;
a vehicle body; and
an ISOfix wire operably coupled to the vehicle body, wherein the ISOfix wire provides a plurality of connection features or points for connecting a child seat thereto, the ISOfix wire providing a plurality of connection features or points for connecting a child seat thereto, and wherein the seatback support includes a plurality of hinge features, wherein one hinge of the plurality of hinge features is pivotally connected to one of the connection features or points of the ISOfix wire to pivotally move the seatback support about the one connection feature or point.

15. The product of claim 14 further comprising a cargo mesh covering at least a portion of the storage cavity defined in the rear face of the seatback support.

16. The product of claim 14 wherein the cargo bag includes a snap flap enclosure portion.

17. The product of claim 14 wherein the seatback support comprises expanded polypropylene.

18. The product of claim 14 wherein the seatback support is constructed and arranged for use in a rear seat in a cabin of a pickup truck.

* * * * *